(12) United States Patent
Schubert et al.

(10) Patent No.: US 8,916,998 B2
(45) Date of Patent: Dec. 23, 2014

(54) CONTROL CIRCUIT FOR AN ELECTRICAL DRIVE DEVICE, HAVING CONFINED CURRENT LOOPS AND REDUCED INTERFERENCE EMISSIONS

(75) Inventors: Goeran Schubert, Schwabach (DE); Manuel Graf, Nuremberg (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 268 days.

(21) Appl. No.: 13/505,525

(22) PCT Filed: Nov. 11, 2010

(86) PCT No.: PCT/DE2010/001307
§ 371 (c)(1),
(2), (4) Date: May 2, 2012

(87) PCT Pub. No.: WO2011/057609
PCT Pub. Date: May 19, 2011

(65) Prior Publication Data
US 2012/0212090 A1    Aug. 23, 2012

(30) Foreign Application Priority Data
Nov. 12, 2009    (DE) .......................... 10 2009 052 757

(51) Int. Cl.
| H02K 11/00 | (2006.01) |
| H02M 1/44 | (2007.01) |
| H02P 27/08 | (2006.01) |
| H02M 7/00 | (2006.01) |

(52) U.S. Cl.
CPC ................. *H02M 1/44* (2013.01); *H02P 27/08* (2013.01); *H02M 7/003* (2013.01)
USPC ...................................... 310/68 R; 310/68 D

(58) Field of Classification Search
CPC ....... H02K 5/08; H02K 5/22; H02K 11/0068; H02K 11/0073; H02K 11/0089
USPC ................................... 310/68 R, 71, 72, 68 D
See application file for complete search history.

(56) References Cited

U.S. PATENT DOCUMENTS

| 5,073,736 A | * | 12/1991 | Gschwender et al. ...... 310/68 A |
| 6,181,590 B1 | | 1/2001 | Yamane et al. |

(Continued)

FOREIGN PATENT DOCUMENTS

| DE | 101 61 632 | 7/2003 |
| DE | 102 32 716 | 4/2004 |

(Continued)

OTHER PUBLICATIONS

International Search Report of the International Searching Authority for International Application PCT/DE2010/001307, mailed Nov. 18, 2011, 2 pages, European Patent Office, HV Rijswijk, Netherlands.

(Continued)

*Primary Examiner* — Michael Andrews
(74) *Attorney, Agent, or Firm* — W. F. Fasse

(57) ABSTRACT

An electrical drive device (1) includes a control circuit (3) connectable to a voltage source (5) on the input side and to an electric drive motor (4) on the output side. The control circuit (3) includes two separate return conductors (13, 35) connected to each other at a single connection point (36). One return conductor (13) is connected to the ground terminal (12) of the control circuit (3). The other return conductor (35) is connected to a motor converter (14), a converter control (15) and a back-up capacitor (19). Due to this arrangement, the currents ($i_s$, $i_a$) flowing in a back-up circuit loop (31) and a control circuit loop (32) are confined to remain within the control circuit (3) and are separated from a housing (10), for example the chassis of a motor vehicle. As a result, the electrical drive device (1) has low interference emissions.

8 Claims, 3 Drawing Sheets

(56) References Cited

U.S. PATENT DOCUMENTS

| | | |
|---|---|---|
| 6,327,165 B1 | 12/2001 | Yamane et al. |
| 7,911,162 B2 | 3/2011 | Hanada |
| 2005/0052804 A1 | 3/2005 | Azuma et al. |
| 2007/0103951 A1* | 5/2007 | Ishikawa et al. ............... 363/146 |
| 2008/0166246 A1* | 7/2008 | Swanson et al. ................. 310/90 |
| 2012/0212090 A1* | 8/2012 | Schubert et al. ................. 310/71 |
| 2013/0009581 A1 | 1/2013 | Schubert et al. |

FOREIGN PATENT DOCUMENTS

| | | |
|---|---|---|
| EP | 1 724 911 | 11/2006 |
| EP | 1 942 574 | 7/2008 |
| JP | 07-184301 A | 7/1995 |
| JP | 2001-023780 A | 1/2001 |
| JP | 2003-143868 A | 5/2003 |
| JP | 2007-135252 A | 5/2007 |
| JP | 2009-060691 A | 3/2009 |

OTHER PUBLICATIONS

PCT International Preliminary Report on Patentability, including English Translation of PCT Written Opinion of the International Searching Authority for International Application PCT/DE2010/001307, issued May 15, 2012, 6 pages, International Bureau of WIPO, Geneva, Switzerland.

* cited by examiner

CONTROL CIRCUIT FOR AN ELECTRICAL DRIVE DEVICE, HAVING CONFINED CURRENT LOOPS AND REDUCED INTERFERENCE EMISSIONS

FIELD OF THE INVENTION

The invention relates to a control circuit. The invention further relates to an electrical drive device including such a control circuit.

BACKGROUND INFORMATION

Electrical drive devices are used, for example, in the form of electric auxiliary drives in the automation and household appliances industries as well as in rail vehicle technology, automobile technology and aeronautics. In said drive devices, the electric drive motor is connected to a motor converter which is controlled by a converter control. The motor converter is fed by a voltage source and a back-up capacitor. The drawback is that such drive devices have high interference emissions which cause more and more problems in many areas of use.

SUMMARY OF THE INVENTION

An object of at least one of the embodiments of the invention is to provide a control circuit for an electrical drive device which reduces the interference emissions of the latter.

The aforesaid object has been achieved by an embodiment of a control circuit having certain features set forth herein. It has been found that said high interference emissions are caused by the fact that the control circuit currents in the control circuit and the back-up circuit currents in the back-up circuit change dramatically over time, which results in voltage drops in the return conductor between the back-up capacitor and the motor converter and between the converter control and the motor converter. Said voltage drops, in turn, drive highly dynamic currents which flow in a closed circuit through a housing, for example the chassis and the engine block in a motor vehicle, and through the second terminal of the control circuit referred to as ground terminal. The currents flowing in this housing circuit are not filtered, leading to high values in emission measurements.

The control circuit according to at least one embodiment of the invention is based on the idea to separate the highly dynamic currents of the motor converter from the housing, i.e. the chassis or the engine block of the internal-combustion engine, and to confine them to the control circuit. This is achieved by providing the control circuit with two separate return conductors. The first return conductor connects the back-up capacitor and the motor converter as well as the motor converter and the converter control and serves to form the back-up circuit and the control circuit. In contrast, the second terminal, i.e. the ground terminal, is connected to a separate second return conductor. To ensure a uniform reference potential of the return conductors, they are connected to each other at exactly one connection point. The control circuit currents and the back-up circuit currents flow through the first return conductor. As the first return conductor is connected to the second return conductor only at one connection point, the control circuit currents and back-up circuit currents will not lead to currents flowing through the second return conductor, the second terminal and the housing. In this way, the control circuit currents and back-up circuit currents are confined to a defined space and separated from the housing, thus considerably reducing the emission values of the motor converter or of a drive device operated by means of the control circuit, from the LW range through to the VHF range.

A control circuit according to a further embodiment feature has the two return conductors connected to each other at exactly one connection point of which the spatial size is smaller than that of the return conductors themselves. This effectively prevents currents caused by the control circuit currents and back-up circuit currents from flowing through the second terminal and the housing.

A control circuit according to another embodiment feature has the converter control circuit and the back-up circuit formed on a single common component carrier on which the control circuit is arranged. This enables the control circuit currents and back-up circuit currents to be confined to the component carrier, i.e. to a small space.

A control circuit according to further inventive embodiment features is configured so that the charging and discharging currents flowing between the converter control and the motor converter, and/or flowing between the back-up capacitor and the motor converter, are respectively confined to the drive device control circuit. This ensures low interference emissions.

A control circuit according to another embodiment is arranged on a component carrier selected from a printed-circuit board, a Low Temperature Cofired Ceramic (LTCC) substrate or a thick-film ceramic substrate, which is cost-efficient to produce since the control circuit currents and back-up circuit currents can be confined to the component carrier by simply changing the layout of said component carrier.

Another object of at least one of the embodiments of the invention is to provide an electrical drive device having low interference emissions.

The aforesaid object has been achieved by an embodiment of an electrical drive device having certain features set forth herein, having a voltage source and an electric drive motor connected to a control circuit according to an embodiment of the invention. The advantages of this embodiment of the drive device according to the invention are the same as the advantages of the control circuit according to at least one embodiment of the invention described above.

An electrical drive device in which a motor housing of the drive motor is either electrically insulated or connected to the first return conductor achieves an even greater reduction of interference emissions because the currents flowing in the current circuit formed by the drive motor, the drive motor housing and the motor converter no longer flow through the second terminal and the housing, but instead are confined to a small space and separated from the housing.

BRIEF DESCRIPTION OF THE DRAWINGS

Further features, advantages and details of the invention are set out in the below description of several exemplary embodiments. In the figures.

DETAILED DESCRIPTION OF EXAMPLE EMBODIMENTS OF THE INVENTION

Figure 1:
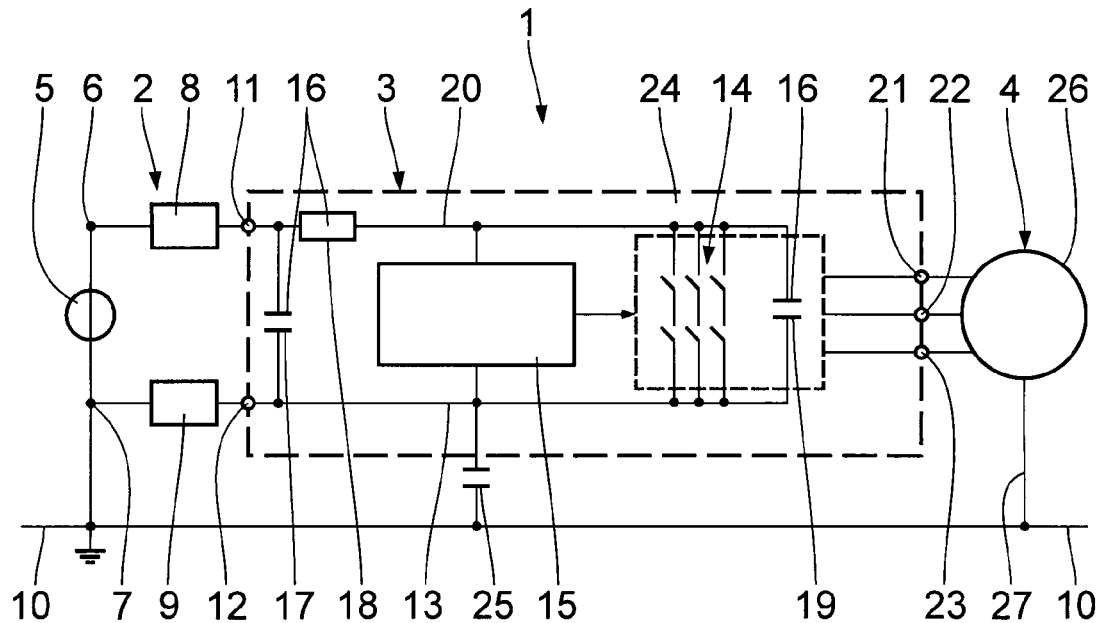
FIG. 1 shows a circuit concept of an electrical drive device according to the state of the art.

Below, the circuit concept of an electrical drive device 1 according to the state of the art will first be described with reference to FIGS. 1 to 3. The drive device 1 comprises a supply unit 2 which controls an electric drive motor 4 by means of a control circuit 3.

The supply unit 2 comprises a voltage source 5 or a direct-current source, the poles 6, 7 of which are connected to so-called line impedance stabilization networks 8, 9. In the measurement configuration shown, the line impedance stabilization networks 8, 9 simulate an on-board network of a motor vehicle, which is fed by the voltage source 5 in the form of a battery. The pole 7 of the voltage source 5 is connected to a housing 10 which serves as a return conductor or ground conductor. The housing 10 is, for example, the chassis of a motor vehicle or the engine block of an internal-combustion engine.

The control circuit 3 comprises two terminals 11, 12 which are connected to the supply unit 2 and the voltage source 5. The first terminal 11 is referred to as Kl30 terminal and the second terminal 12 as Kl31 terminal. The terminal 12 is the ground terminal of the control circuit 3 and is connected to the internal return conductor 13 (internal GND) of the control circuit 3.

To control the drive motor 4, the control circuit 3 comprises a motor converter 14 in the form of a B6 bridge, which is controlled by means of a converter control 15. To suppress dynamic currents, a π filter 16 is connected in the control circuit 3 towards the voltage source 5. The π filter 16 comprises an input capacitor 17 on the input side, which is connected between the terminals 11, 12. Parallel to the input capacitor 17, a coil 18 and a back-up capacitor 19 are connected in series. The converter control 15 and the motor converter 14 are connected between the connecting line 20 extending from the coil 18 to the back-up capacitor 19 and the return conductor 13. On the output side, the control circuit 3 comprises three output terminals 21, 22, 23 which are connected to the drive motor 4.

The control circuit 3 is formed on a component carrier 24 which usually comprises a conductive layer as a return conductor 13 or internal ground. There is a housing capacitance 25 between the return conductor 13 and the housing 10.

The drive motor 4 is formed as a brushless direct-current motor (BLDC motor) and comprises several motor windings arranged in a motor housing 26, which are not shown in detail. The motor housing 26 and the housing 10 are connected to each other by means of a connecting conductor 27, thus having a uniform reference potential.

Figure 2:
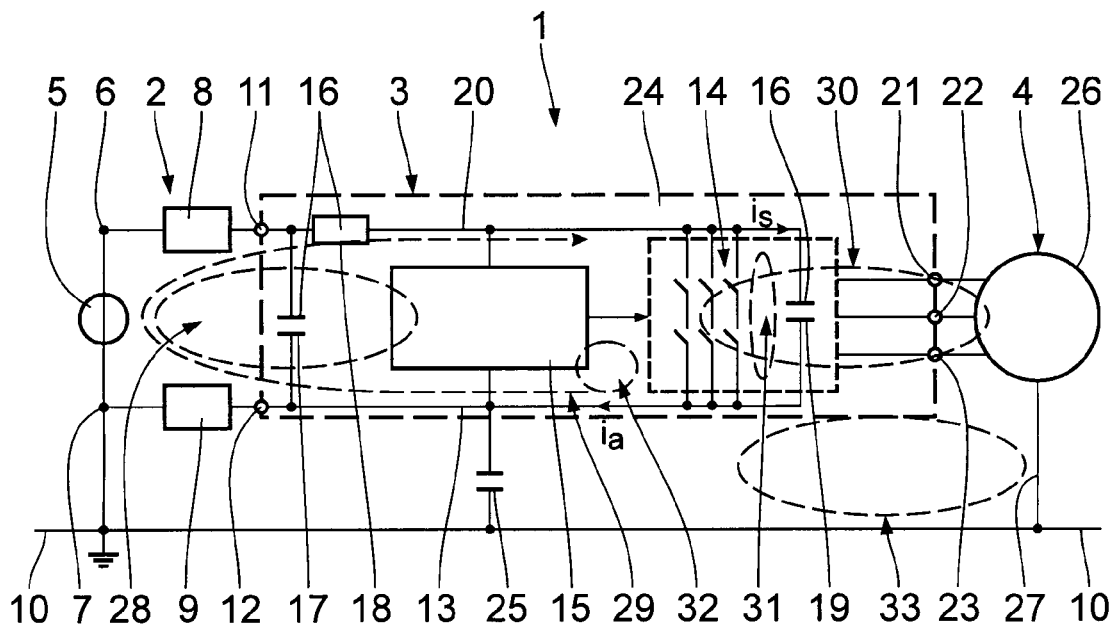
FIG. 2 shows the circuit concept of FIG. 1 including the resulting current circuits.
Figure 3:
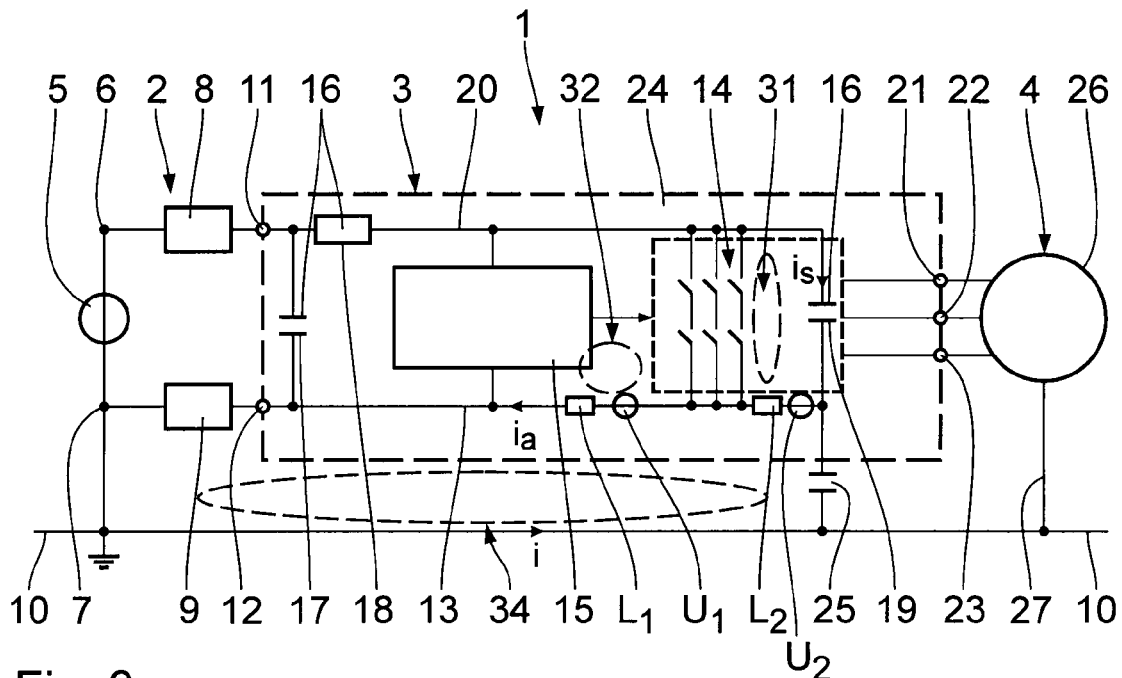
FIG. 3 shows the circuit concept of FIG. 1 including the current circuit closed by the housing.

The current circuits resulting in this drive device 1 are shown in FIG. 2. Low-dynamic power is delivered directly from the voltage source 5, supplying power to the converter control 15 by means of a control recharge circuit 28 and to the back-up capacitor 19 by means of a back-up recharge circuit 29. The motor converter 14 and the drive motor 4 that is connected thereto form a load circuit 30. The dynamic energy component of the load circuit 30 is delivered by the back-up capacitor 19, which, in particular, also drives the quadrature-axis currents flowing in the motor converter 14. This means, the back-up capacitor 19 and the motor converter 14 form a back-up circuit 31 where the back-up circuit currents $i_s$ flow as charge and discharge currents. Correspondingly, the converter control 15 and the motor converter 14 form a control circuit 32 where the control circuit currents $i_a$ flow as charge and discharge currents. The π filter 16 serves to suppress the dynamic currents towards the current source 5. Capacitances of the motor winding towards the motor housing 26 close a housing circuit 33 where dynamic currents flow.

It has been found that in the drive device 1 according to the prior art there are voltage drops in the return conductor 13 between the back-up capacitor 19 and the motor converter 14 and between the converter control 15 and the motor converter 14. Said voltage drops occur on inductances $L_1$ and $L_2$ of the return conductor 13. In FIG. 3, replacement voltage sources $U_1$ and $U_2$ have been introduced for the voltage drops on the inductivities $L_1$ and $L_2$ of the return conductor 13 between the back-up capacitor 19 and the motor converter 14 and between the converter control 15 and the motor converter 14. By way of the housing capacitance 25, said replacement voltage sources $U_1$ and $U_2$ drive dynamic currents I in the return conductor 13, which flow through the terminal 12 and the housing 10. The current circuit caused in this way is referred to as I housing circuit 34. This means, in a motor vehicle, the replacement voltage sources $U_1$ and $U_2$ drive dynamic currents (I housing) by way of the housing capacitance 25, which flow in a closed circuit through the chassis or the engine block of the internal-combustion engine and the Kl31 terminal 12 and the Kl31 cable. The dramatic change over time, di/dt, of the control circuit currents $i_a$ and the back-up circuit currents $i_s$ results in highly dynamic voltages of the replacement voltage sources $U_1$ and $U_2$. Said voltages, in turn, drive the current I (GND housing chassis Kl31 current) in the filterless I housing circuit 34. It has further been found that this leads to high values in emission measurements. These disadvantages are to be overcome or avoided according to one or more embodiments of the invention.

Figure 4:
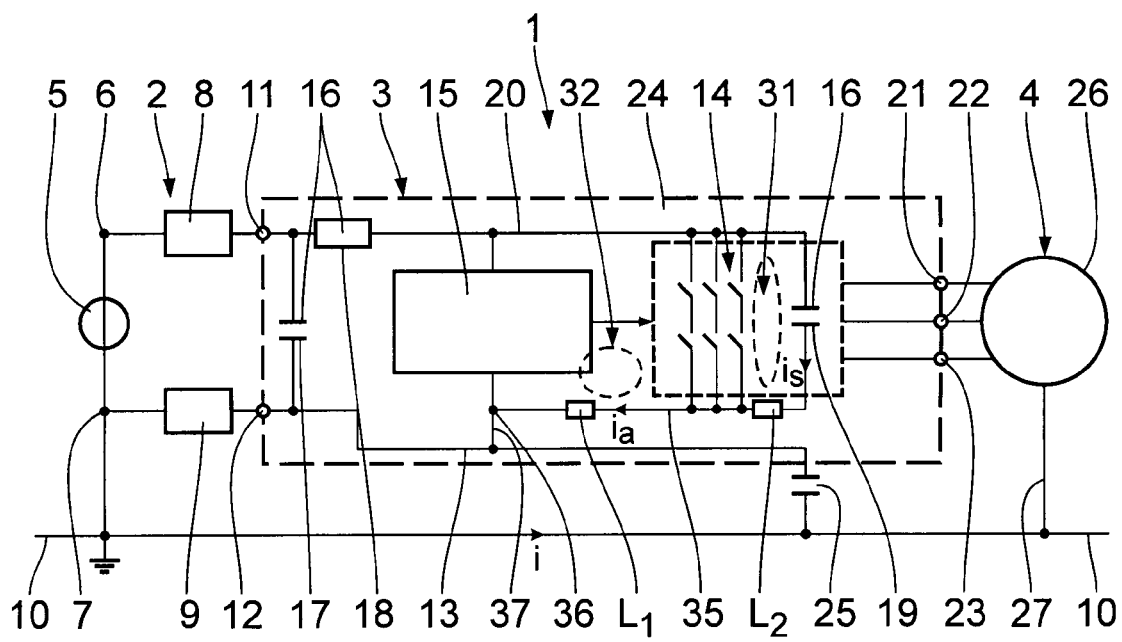
FIG. 4 shows the circuit concept of an electrical drive device according to the invention according to a first exemplary embodiment.

Referring to FIG. 4, an electrical drive device 1 according to the invention according to a first exemplary embodiment will now be described, which device comprises a control circuit 3 according to an embodiment of the invention. Those aspects of the drive device 1 and the control circuit that are the same as in the drive device 1 and the control circuit 3 according to the state of the art, which have been described above, will not be described in detail again. In this regard, reference is made to the above description of the drive device 1 and the control circuit 3 according to the state of the art.

The control circuit 3 according to one or more embodiments of the invention, e.g. as shown in FIG. 4, comprises an additional return conductor 35 which serves to form the back-up circuit 31 and the control circuit 32. The separate return conductor 35 is referred to as a high-frequency ground conductor and forms an internal high-frequency ground (HF GND) of the control circuit 3. The inductivities $L_1$ and $L_2$ of the return conductor 35 are schematically shown in FIG. 4. The return conductor 35 is connected to the return conductor 13 by means of a connecting line 37 at a connection point 36 referred to as a star point. The return conductor 13 is connected to the terminal 12 in the usual way. This means, the back-up circuit 31 is formed by the motor converter 14, the back-up capacitor 19 and the separate return conductor 35. Correspondingly, the control circuit 32 is formed by the motor converter 14, the converter control 15 and the separate return conductor 35. While the return conductors 13 and 35 are connected to each other at the exactly one connection point 36 to ensure a uniform reference potential, no highly dynamic currents can flow through the connecting line 37 due to the small spatial extension of the connection point 36 and the connecting line 37, compared to the return conductors 13 and 35. As a result, highly dynamic currents are separated from the housing 10. The charge and discharge currents flowing between the back-up capacitor 19 and the motor converter 15, i.e. the back-up circuit currents $i_s$, are confined to the back-up circuit 31 that is closed by the return conductor 35. Correspondingly, the charge and discharge currents flowing between the motor converter 14 and the converter control 15, i.e. the control circuit currents $i_a$, are confined to the control circuit 32 that is closed by the return conductor 35. As a result, the highly dynamic back-up circuit currents $i_s$ and control circuit currents $i_a$ are separated from the housing 10, i.e. the chassis or the engine block. This means, said highly dynamic currents do no longer flow through the terminal 12, the line impedance stabilization network 9 and the housing 10, which correspond to the cable trunk and the chassis or the vehicle engine in a motor vehicle. As a result, the emission values of the motor converter 14 are considerably reduced (by up to 30 dB), from the LW range through to the VHF range.

As explained above, the highly dynamic currents are confined to the control circuit 3, i.e. to a small space, thus eliminating interference in the drive motor 4 over a wide frequency range. The control circuit 3 is arranged on the component carrier 24, so that the back-up circuit 31 and the control circuit 32 are formed on said component carrier 24. The return conductors 13 and 35 are, for example, two different conductive layers on the component carrier 24, which are connected to each other at the connection point 36 with a small spatial extension. This means, the highly dynamic currents can be confined by changing the layout of the component carrier 24, without incurring additional costs. The component carrier 24 is, for example, a printed circuit board, LTCC (Low Temperature Cofired Ceramic) or thick-film ceramic substrate.

Figure 5:
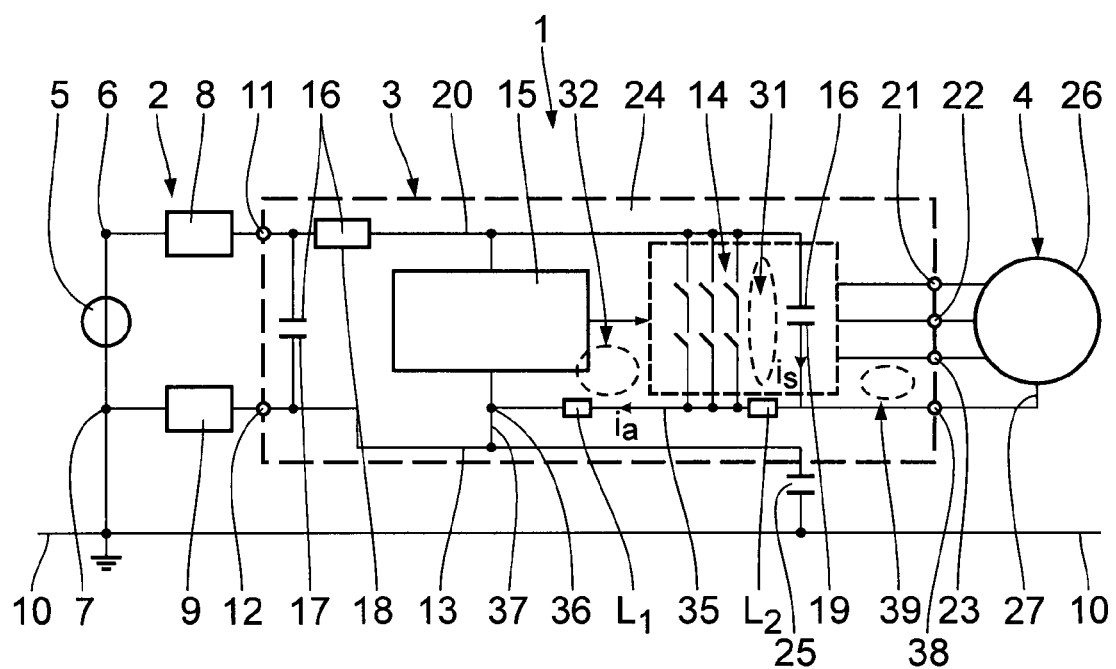
FIG. 5 shows the circuit concept of an electrical drive device according to the invention according to a second exemplary embodiment.

Referring to FIG. 5, a second drive device 1 according to a second embodiment of the invention, comprising a control circuit 3 according to a second embodiment of the invention, will now be described. In contrast to the drive device according to FIG. 4, the motor housing 26 of the drive motor 4 in FIG. 5 is supported in an insulated manner and not directly connected to the housing 10. The connecting line 27 connects the motor housing 26 to an output terminal 38 of the control circuit 3, which, in turn, is connected to the separate return conductor 35. The drive motor 4 or the capacitances of the motor windings, the motor housing 26, the connecting line 27, the return conductor 35 and the motor converter 14 form a current circuit 39 which does not include the housing 10. As a result, the currents flowing in said current circuit 39 do not flow through the housing 10, thus improving the emission values of the drive device 1.

The invention claimed is:

1. A circuit arrangement comprising a drive device control circuit for controlling an electrical drive device, said drive device control circuit comprising:
    a first terminal and a second terminal adapted to be connected externally to a voltage source,
    a motor converter arranged internally within the drive device control circuit, and adapted to control an electric drive motor,
    a converter control arranged internally within the drive device control circuit, and connected and adapted to control the motor converter,
    a π-filter including:
        an input capacitor connected to the first and second terminals internally within the drive device control circuit,
        a back-up capacitor connected in parallel to the motor converter, and
        a coil connected to the first terminal and connected in series with the back-up capacitor internally within the drive device control circuit,
    a first return conductor that connects the back-up capacitor and the motor converter to each other to form a back-up circuit, and that connects the motor converter and the converter control to each other to form a converter control circuit, and
    a second return conductor that is connected to the second terminal internally within the drive device control circuit,
    wherein the first and second return conductors are connected to each other only at exactly one single connection point internally within the drive device control circuit,
    wherein the second return conductor extends from the second terminal to the one single connection point internally within the drive device control circuit, and
    wherein the one single connection point has a smaller spatial extension than the first and second return conductors themselves.

2. The circuit arrangement according to claim 1, further comprising a single component carrier on which said drive device control circuit is arranged, wherein both the converter control circuit as well as the back-up circuit are formed in common on the single component carrier.

3. The circuit arrangement according to claim 2, wherein the component carrier is selected from the group consisting of printed circuit boards, low temperature co-fired ceramic (LTCC) substrates and thick-layer ceramic substrates.

4. The circuit arrangement according to claim 1, configured and arranged such that charge and discharge currents flowing between the converter control and the motor converter are confined to the drive device control circuit.

5. The circuit arrangement according to claim 1, configured and arranged such that charge and discharge currents flowing between the back-up capacitor and the motor converter are confined to the drive device control circuit.

6. The circuit arrangement according to claim 1, further comprising:
    a grounded housing,
    the voltage source, having a first pole thereof connected to the first terminal and having a second pole thereof connected to the second terminal and connected to the grounded housing as a ground,
    the electrical drive device, comprising an electric drive motor connected to the motor converter, and
    a housing capacitance formed between the second return conductor and the grounded housing.

7. The circuit arrangement according to claim 6, wherein the electrical drive device further comprises a motor housing of the drive motor, which is supported in an electrically insulated manner.

8. The circuit arrangement according to claim 6, wherein the electrical drive device further comprises a motor housing of the drive motor, which is connected to the first return conductor.

* * * * *